United States Patent
Heath (12)

(10) Patent No.: US 6,698,792 B2
(45) Date of Patent: Mar. 2, 2004

(54) AIRBAG TIE BACK

(75) Inventor: Daniel A. Heath, McBee, SC (US)

(73) Assignee: Takata Restraint Systems, Inc., Auburn Hills, MI (US)

(*) Notice: Subject to any disclaimer, the term of this patent is extended or adjusted under 35 U.S.C. 154(b) by 0 days.

(21) Appl. No.: 10/128,076

(22) Filed: Apr. 23, 2002

(65) Prior Publication Data

US 2003/0197359 A1 Oct. 23, 2003

(51) Int. Cl.[7] ............................................... B60R 21/16
(52) U.S. Cl. .................................. 280/743.2; 280/728.2
(58) Field of Search ......................... 280/743.2, 728.2, 280/743.1

(56) References Cited

U.S. PATENT DOCUMENTS

| | | | | |
|---|---|---|---|---|
| 5,562,301 A | * | 10/1996 | Lutz | 280/728.2 |
| 5,588,667 A | * | 12/1996 | Emambakhsh et al. | 280/728.2 |
| 5,626,358 A | * | 5/1997 | Ricks et al. | 280/731 |
| 5,865,466 A | * | 2/1999 | Yamamoto et al. | 280/743.1 |
| 6,070,904 A | * | 6/2000 | Ozaki et al. | 280/743.1 |
| 6,206,409 B1 | * | 3/2001 | Kato et al. | 280/728.2 |
| 2002/0020995 A1 | * | 2/2002 | Abe et al. | 280/743.1 |
| 2002/0089154 A1 | * | 7/2002 | Ogawa et al. | 280/730.2 |

FOREIGN PATENT DOCUMENTS

| | | | | |
|---|---|---|---|---|
| JP | 2-175353 A | * | 7/1990 | |
| JP | 3-136946 A | * | 6/1991 | |

* cited by examiner

*Primary Examiner*—Paul N. Dickson
*Assistant Examiner*—Ruth Ilan
(74) *Attorney, Agent, or Firm*—Dinnin & Dunn, P.C.

(57) ABSTRACT

A simple string device 1 is used to retain an airbag in its folded position. The string device 1 is comprised of a string 10 formed in a loop or various types of loops, according to particular airbag configurations. The string device 2 is looped over securing studs 46 which protrude from the base 41 of the airbag assembly and are used to secure the airbag unit to a mounting structure. The string device 1 is then looped over the folded airbag 44 and looped around the securing studs 46 from the opposite direction, thus securing the folded airbag 44 in position.

5 Claims, 2 Drawing Sheets

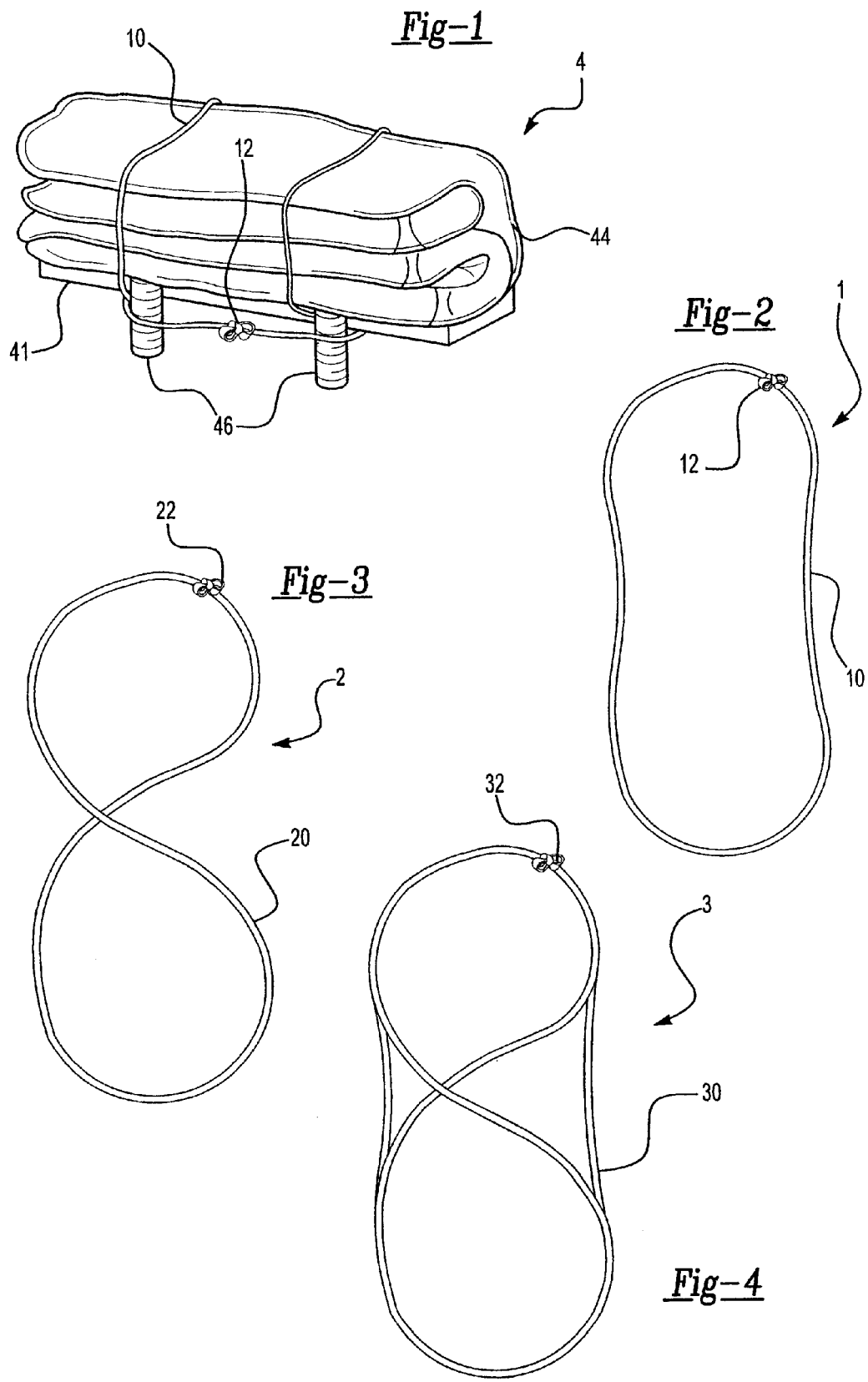

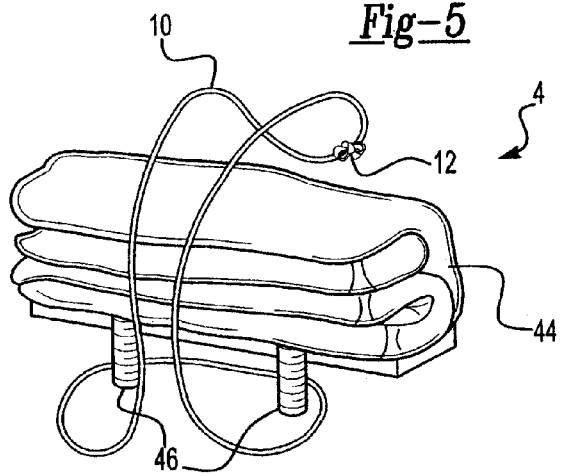
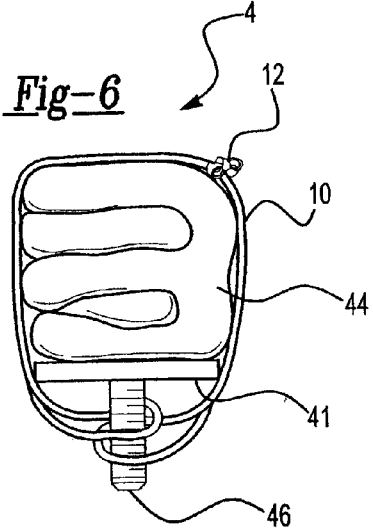
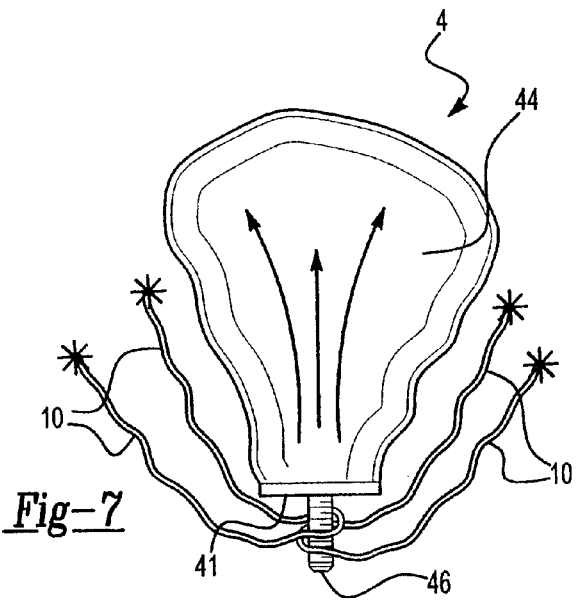
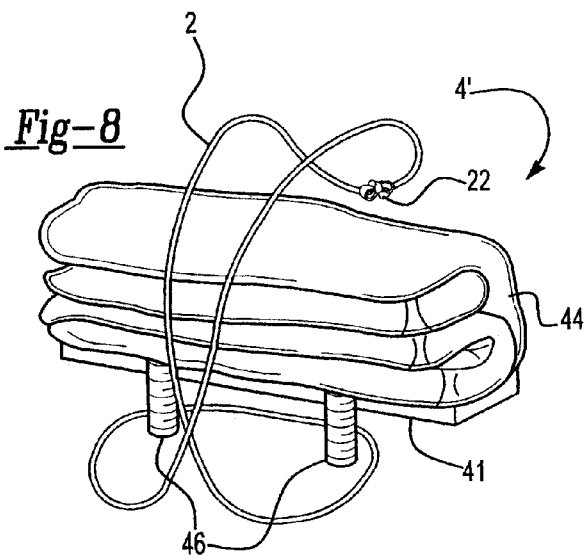

AIRBAG TIE BACK

FIELD OF THE INVENTION

The present invention relates generally to safety restraint systems using airbags and particularly to a device and method of holding an airbag in a wrapped position. These devices must be strong enough to hold the deflated airbag in its initial position, yet weak enough to be easily broken, allowing the airbag to rapidly inflate.

BACKGROUND AND SUMMARY OF THE INVENTION

Various restraining methods are used to package airbags in vehicles. When installed, an airbag is in a deflated posture, folded on top of itself, allowing for easy packaging in the airbag retainer. Various methods for restraining the airbag in its folded position are known in the industry. Some methods include covering the folded bag with a smaller, thinner bag, or wrapping the bag with a perforated paper cover or a woven fabric cover to wrap around the folded airbag. These methods are complex and expensive. Therefore, a simple, economical method of retaining an uninflated airbag in position is desired in the industry.

To reduce the complexity of such mechanisms, it is an object of the present invention to provide an improved method for supporting and restraining an uninflated airbag in the airbag retainer. The present invention utilizes a simple string as a restraint. The string material is preferably industrial sewing thread. The string is tied into a singular loop or an array of various loop types, depending on the size and shape of the particular airbag.

The uninflated, folded airbag is typically fastened to a base having at least one stud protruding therefrom. This stud is utilized to secure the airbag assembly to an airbag retainer. The string is looped over the stud in a first direction, looped around the airbag itself, then looped over the stud again from an opposing direction, thus securing the airbag in its folded position.

In the event of an accident, the airbag must rapidly inflate. It is therefore required that the string have sufficient tensile strength to retain the uninflated airbag in position during regular vehicle operation, yet break readily under stress to allow for proper deployment of the airbag during an accident.

Other uses and advantages of the present invention will become apparent from the detailed description provided hereinafter. It should be understood that the detailed description and specific examples, while indicating preferred embodiments of the invention, are intended for purposes of illustration only, since various changes and modifications to the invention will be apparent to those of ordinary skill in the art from this detailed description.

BRIEF DESCRIPTION OF THE DRAWINGS

The present invention will be more fully understood from the detailed description and the accompanying drawings, wherein:

FIG. 1 is a schematic perspective view of a folded airbag in accordance with the present invention;

FIG. 2 is a schematic view of a string in accordance with the present invention;

FIG. 3 is a schematic view of a string in accordance with the present invention;

FIG. 4 is a schematic view of a string in accordance with the present invention;

FIG. 5 is a schematic view of a folded airbag in accordance with the present invention;

FIG. 6 is a schematic side view of a folded and secured airbag in accordance with the present invention;

FIG. 7 is a schematic view of a deployed airbag; and

FIG. 8 is a schematic view of a folded airbag with a "FIG. 8" retaining string in accordance with the present invention.

DETAILED DESCRIPTION OF THE PREFERRED EMBODIMENT(S)

The present invention is a method and apparatus for support and restraint of an uninflated, folded airbag in an airbag retainer. The apparatus must sufficiently restrain the airbag in the retainer during regular vehicle operations but allow for the proper deployment of the airbag in the event of an accident. When an accident occurs, the properly deployed airbag must be fully inflated within milliseconds. Therefore, the retention device must not hinder the inflation of the airbag.

Referring FIGS. 1 and 2, and in accordance with a preferred, constructed embodiment of the instant invention, a string device 1 is preferably constructed of a length of industrial sewing string 10 tied into a loop, having a knot 12. Other materials, such as nylon or cotton, having a tensile strength that contains the bag in an uninflated condition but readily breaks upon airbag inflation pressure may also be employed to form the fiber or cord 10. An alternative string device 2, as shown in FIG. 3, is comprised of a length of industrial sewing string 20 tied into a loop, having a knot 22 and further including an additional step of twisting the string device 2 into a "FIG. 8". This provides a second method of securing the uninflated, folded airbag 44, shown in FIGS. 5 and 6, into the proper position. FIG. 4 illustrates a combination of the loops shown in FIGS. 2 and 3. In this embodiment, the string device 3 is comprised of a string 30 which is tied into a loop, having a knot 32, further manipulated to include a "FIG. 8".

Various uses of the string devices 1, 2, and 3 are shown in FIGS. 1 and 5, 6 and 8. FIG. 5 illustrates an airbag assembly 4 having a base unit 41 with two securing studs 46 protruding therefrom. A string device 1 is shown partially looped over the airbag assembly 4. One end of the string 10 is initially looped over the securing studs 46. The string 10 is then looped over the folded airbag 44 and brought back under to again loop over the securing studs 46 from the opposite direction. FIGS. 1 and 6 illustrate a completely wrapped and secured airbag assembly 4. The folded airbag 44 is secured to base 41 by the string 10 which has been installed using the above described steps.

It is essential that the retaining system permit the airbag to properly deploy. Therefore, the string device 10 must be easily broken by the deploying airbag 44. This airbag 44 deployment is depicted schematically in FIG. 6, wherein the string 10 is broken as a result of the airbag's 44 inflation.

FIG. 8 illustrates an alternative implementation of the wrapping of the string 20 around the airbag assembly 4' in a "FIG. 8" configuration. Additionally, a combination of the loops shown in FIGS. 2 and 3 (see FIG. 4) may be used to retain the airbag 44 in the folded position.

While specific embodiments of the instant invention have been described in detail, those with ordinary skill in the art will appreciate that various modifications and alternatives to those details could be developed in light of the overall teachings of this disclosure. Accordingly, the particular arrangements disclosed are meant to be illustrative only and not limiting as to the scope of the invention, which is to be given the full breadth of the appended claims and any and all equivalents thereof.

I claim:

1. A retention system for an airbag assembly having an airbag and a base having at least one securing stud protruding therefrom comprising:

a looped string positioned over said airbag and around the securing stud to secure said airbag in an uninflated, folded position.

2. The airbag retention system of claim 1, wherein said looped string has a FIG. "8" configuration.

3. A method of retaining an airbag to a base having at least one securing stud protruding therefrom, the method comprising the steps of:

folding an uninflated airbag proximate said base;

looping a string over said folded airbag; and securing said string to said base by looping the string around the securing stud.

4. A method of retaining an airbag to an airbag base having at least one securing stud protruding therefrom comprising the steps of:

folding an uninflated airbag proximate said base;

forming a loop with a length of string;

placing a first end of said string loop around said securing stud;

wrapping said string loop over said airbag and;

placing a second end of said string loop around said securing stud.

5. The method of claim 4 wherein said string loop is a FIG. "8".

* * * * *

UNITED STATES PATENT AND TRADEMARK OFFICE
CERTIFICATE OF CORRECTION

PATENT NO.   : 6,698,792 B2
DATED        : March 2, 2004
INVENTOR(S)  : Daniel A. Heath It is certified that error appears in the above-identified patent and that said Letters Patent is hereby corrected as shown below:

Column 2,
Lines 36, 42 and 62, "FIG. 8" should be -- figure 8 --

Column 3,
Line 16, "FIG. 8" should be -- figure 8 --

Column 4,
Line 16, "FIG. 8" should be -- figure 8 --

Signed and Sealed this

Twentieth Day of July, 2004

JON W. DUDAS
*Acting Director of the United States Patent and Trademark Office*